(12) United States Patent
Akke et al.

(10) Patent No.: US 7,948,241 B2
(45) Date of Patent: May 24, 2011

(54) FAULT DIRECTION DETERMINATION

(75) Inventors: Magnus Akke, Lund (SE); Björn Westman, Västerås (SE); Henrik Ashuvud, Västerås (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 12/814,572

(22) Filed: Jun. 14, 2010

(65) Prior Publication Data

US 2010/0244851 A1  Sep. 30, 2010

Related U.S. Application Data

(63) Continuation of application No. PCT/EP2007/063937, filed on Dec. 14, 2007.

(51) Int. Cl.
*G01R 31/08* (2006.01)
(52) U.S. Cl. ........................... 324/522; 324/521
(58) Field of Classification Search .......... 324/522, 324/521
See application file for complete search history.

(56) References Cited

U.S. PATENT DOCUMENTS

| | | | |
|---|---|---|---|
| 4,251,766 A | 2/1981 | Souillard | |
| 4,450,497 A * | 5/1984 | Bignell | 361/82 |
| 4,731,689 A | 3/1988 | Nimmersjö et al. | |
| 4,774,621 A | 9/1988 | Andow | |
| 4,803,635 A | 2/1989 | Andow | |
| 5,072,403 A * | 12/1991 | Johns | 702/59 |
| 7,106,565 B2 * | 9/2006 | Kase et al. | 361/76 |

OTHER PUBLICATIONS

International Preliminary Report on Patentability; PCT/EP2007/063937; Feb. 11, 2010; 11 pages.
International Search Report and Written Opinion of the International Searching Authority; PCT/EP2007/063937; Aug. 13, 2008; 8 pages.

* cited by examiner

*Primary Examiner* — Amy He
(74) *Attorney, Agent, or Firm* — St. Onge Steward Johnston & Reens LLC

(57) ABSTRACT

The invention concerns a method and computer program product for determining the direction of fault in an electrical power system as well as to a fault handling device. In the fault handling device the voltage at a measurement node of the power system is measured, the phase ($\phi_{PF}$) of this voltage ($V_{PF}$) before a fault is stored, the phase ($\phi_F$) of this voltage ($V_F$) at the end of a time interval (TI) following directly after a detected fault is determined, a phase offset ($\phi_O$) is determined as the difference between the phase ($\phi_{PF}$) of the measured voltage ($V_{PF}$) before the fault and the phase ($\phi_F$) of the measured voltage ($V_F$) at the end of the time interval (TI) and the phase ($\phi_F$) of the measured voltage ($V_F$) after the detection of the fault is adjusted with the phase offset ($\phi_O$). Thereafter the adjusted measured voltage is used in determining the direction of fault in relation to the measurement node.

27 Claims, 3 Drawing Sheets

FAULT DIRECTION DETERMINATION

CROSS-REFERENCE TO RELATED APPLICATIONS

The present application is a continuation of pending International patent application PCT/EP2007/063937 filed on Dec. 14, 2007, which designates the United States and the content of which is incorporated herein by reference.

FIELD OF THE INVENTION

The present invention relates to the field of electrical power systems. The invention more particularly relates to a method and computer program product for determining the direction of fault in an electrical power system as well as to a fault handling device which provides such fault direction determination.

BACKGROUND OF THE INVENTION

In the field of electrical power systems it is important to detect and locate faults safely in order to be able to perform necessary measures such as disconnect a section of the system, like to disconnect a power line. The fault handling devices that are used for this are often termed protective relays.

Such a device is normally connected to a measurement node of the electrical power system, where the measurement node may be provided in a power line. When detecting a fault it is then necessary to determine the direction of fault in relation to the node. The way this has traditionally been done is through measuring and storing the voltage before a fault occurs. Then when a fault is detected this pre-stored voltage is used as a reference voltage together with the measured current to determine the direction of the fault. This direction can then be used in locating the position of the fault in the system. Such a device is for instance described in U.S. Pat. No. 4,731,689.

One problem with this approach is that if for instance the power system is set in motion through starting to swing or changing frequency then the reference voltage is unreliable.

There is therefore a need for being able to safely determine the direction of the fault in an electrical power system also under these circumstances.

SUMMARY OF THE INVENTION

The present invention is therefore directed towards providing an improved determination of the direction of fault in an electrical power system.

One object of the present invention is therefore to provide an improved method for determining the direction of fault in an electrical power system.

This object is according to a first aspect of the present invention achieved through a method for determining the direction of fault in an electrical power system comprising the steps of:
  measuring a voltage at a measurement node of the electrical power system, and
  storing at least the phase of the measured voltage before the occurrence of a fault,
characterised by the further steps of
  determining at least the phase of the measured voltage at the end of a time interval following directly after a detection of the fault has been made,
  determining a phase offset as the difference between the phase of the measured voltage before the fault and the phase of the measured voltage at the end of the time interval,
  adjusting the phase of the measured voltage after the detection of the fault with the phase offset, and
  using the adjusted measured voltage in determining the direction of fault in relation to the measurement node.

Another object of the present invention is to provide a fault handling device in an electrical power system, which provides an improved determination of the direction of fault.

This object is according to a second aspect of the present invention achieved through a fault handling device in an electrical power system and comprising:
  a fault direction determining unit arranged to
    receive voltage measurements from a voltage detecting unit arranged to measure a voltage at a measurement node of the electrical power system, and
    store at least the phase of the measured voltage before the occurrence of a fault in a store,
  characterised by the fault direction determining unit being further arranged to determine at least the phase of the measured voltage at the end of a time interval following directly after a detection of the fault has been made,
    determine a phase offset as the difference between the phase of the measured voltage before the fault and the phase of the measured voltage at the end of the time interval,
    adjust the phase of the measured voltage after the detection of the fault with the phase offset, and
    use the adjusted measured voltage in determining the direction of fault in relation to the measurement node.

Another object of the present invention is to provide a computer program product for determining the direction of fault in an electrical power system in an improved way.

This object is according to a third aspect of the present invention achieved through a computer program product for determining the direction of fault in an electrical power system and comprising
  computer program code provided on a computer readable medium and arranged to make a fault handling device in the electrical power system when the code is loaded into the device:
    receive measurements of a voltage at a measurement node of the electrical power system, and
    store at least the phase of the measured voltage before the occurrence of a fault,
  characterised by the computer program code being further arranged to make the fault handling device when the code is loaded into the device
    determine at least the phase of the measured voltage at the end of a time interval following directly after a detection of the fault has been made,
    determine a phase offset as the difference between the phase of the measured voltage before the fault and the phase of the measured voltage at the end of the time interval,
    adjust the phase of the measured voltage after the detection of the fault with the phase offset, and
    use the adjusted measured voltage in determining the direction of fault in relation to the measurement node.

The present invention has the advantage of providing a safer determination of the direction of fault in an electrical power system. The invention more particularly enables the provision of a correct determination of the direction of fault when the fault causes voltage inversion. The invention also avoids slow changes in phase of a measured voltage that are indicative of power swings to influence the determination of direction of the fault. Because of this the probability is raised of selecting a correct action relating to the fault.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
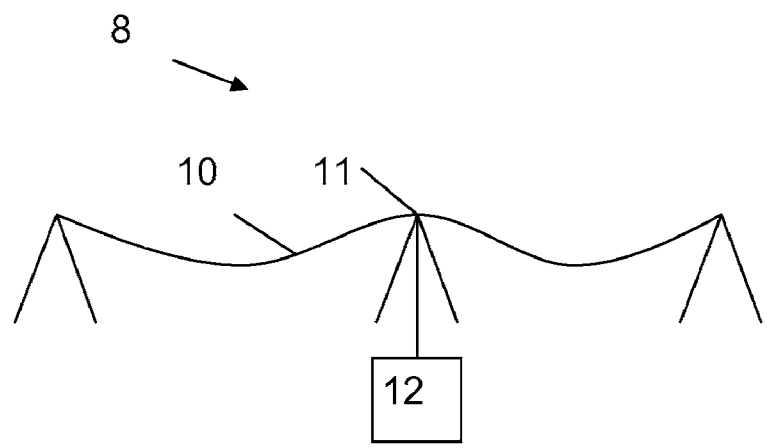
FIG. 1 schematically shows an electrical power system including a power line to which a fault handling device is connected.

FIG. 1 schematically shows a section of an electrical power system 8 comprising a power line 10. In the power line 10 there is provided a measurement node 11. To this measurement node 11 there is connected a fault handling device 12 according to the present invention. The power line 10 is used to transfer electrical power, which is typically electrical AC power. In the electrical power system 8 in FIG. 1 stages that may be included are omitted, such as transformer stations and additional power lines. To the system 8 there may furthermore be connected one or more loads. A measurement node need furthermore not be connected to a power line, but may be connected to another entity of the power system. It should furthermore be realised that there may be normally several measurement nodes and fault handling devices in relation to such a system. A fault handling device 12 is in these types of systems furthermore often called a protection relay.

Figure 2:
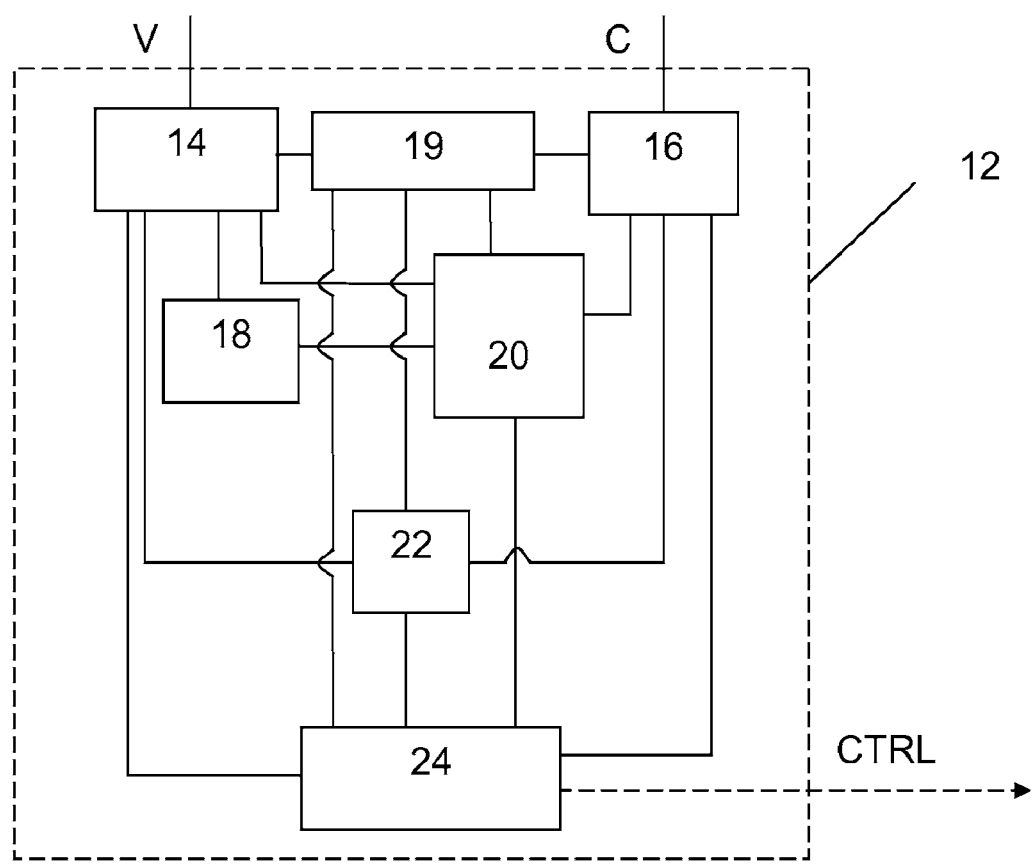
FIG. 2 shows a block schematic of the fault handling device according to the present invention, FIG. 3 schematically shows the fault handling device connected to a number of circuit breaking units provided in the power line of FIG. 1.

FIG. 2 shows a block schematic of the fault handling device 12 according to the present invention. The device 12 includes a voltage detecting unit 14 and a current detecting unit 16, where the voltage detecting unit 14 is arranged to measure the voltage V of the power line and the current detecting unit 16 is arranged to measure the current C of the power line at the measurement node. The voltage detecting unit 14 is furthermore connected to a storage device 18, to a fault detecting unit 19, to a fault direction determining unit 20, to a distance determining unit 22 and to a fault handling decision unit 24. Also the current detecting unit 16 is connected to the fault detecting unit 19, to the fault direction determining unit 20, to the distance determining unit 22 and to the fault handling decision unit 24. The fault detecting unit 19 is also connected to the fault direction determining unit 20, to the distance determining unit 22 and to the fault handling decision unit 24. The fault direction determining unit 20 is also connected to the storage device 18 and to the fault handling decision unit 24. Also the distance determining unit 22 is connected to the fault handling decision unit 24. The fault handling decision unit 24 may furthermore emit a control signal CTRL. What this signal may be used to control will shortly be described.

Figure 3:
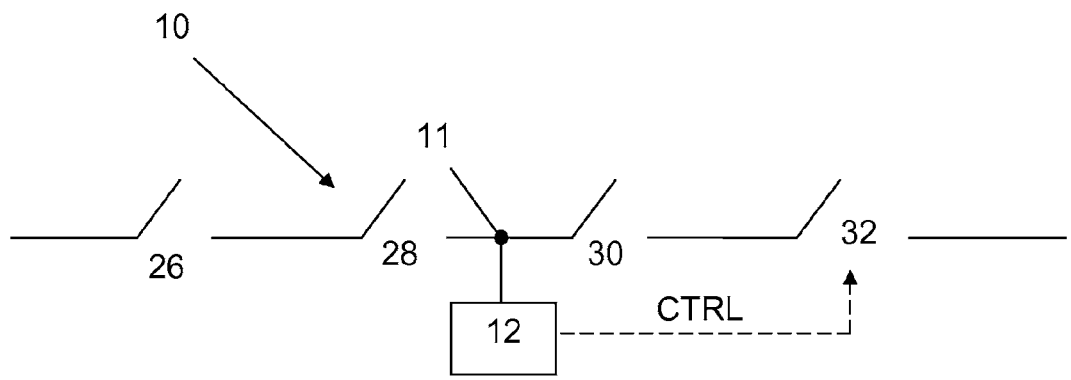

FIG. 3 schematically shows a number of circuit breaking units 26, 28, 30 and 32 provided in the power line 10 of FIG. 1. Also the fault handling device 12 is connected to the power line 10 via the measurement node 11. As can be seen in the figure there is in the power line 10, from left to right, a first circuit breaking unit 26 followed by a second circuit breaking unit 28. Thereafter follows the measurement node 11 to which the fault handling device 12 is connected. After the measurement node 11 follows a third circuit breaking unit 30 and a fourth circuit breaking unit 32, where the fourth circuit breaking unit 32 is shown furthermost to the right in FIG. 3. It should here be realised that the various circuit breaking units 26, 28, 30, 32 may be provided at great distances from each other. The circuit breaking units 26, 28, 30, 32 may be provided as power switches or relays. The above mentioned control signal CTRL is in FIG. 3 shown as being applied to the fourth circuit breaking unit 32 to the right of the measurement node 11. However, it should be realised that the control signal CTRL may be selectively applied to any of the circuit breaking units 26, 28, 30, 32. It is also possible to apply the control signal CTRL to more than one circuit breaking unit. Which one is or which ones are selected depends on where the fault handling device 12 determines that a fault has occurred.

In electrical power systems faults may occur. Such faults may for instance occur because of lightning hitting a point of the power line, in which case current may go from the power line into the ground. In order to locate where the fault has occurred in relation to a measurement node it is then necessary to determine the direction of the fault in relation to the measurement node. In such fault direction determination a voltage is measured and then used as a reference. In electrical power systems there are often provided three phase voltages. The voltage may here be one of the phase voltages. It may also be a voltage that is derived from the phase voltages, like through a combination of these phase voltages. It may in this case be a so-called positive sequence polarizing voltage, a negative sequence polarizing voltage or a zero sequence polarizing voltage. Traditionally such a measured reference voltage is then the detected voltage before the fault. If then the distance to the fault is determined it is then easy to determine where various counter measures are to be applied, such as for instance disconnecting the power line. Such a fault may furthermore cause frequency changes and swinging of the system. Such an influence on the system leads to the voltage detected before the fault not being reliable as a reference and that the fault direction being harder to determine. This is especially not good if the fault direction is needed to be monitored some time after the fault has occurred. The present invention is provided for addressing this problem.

Figure 4:
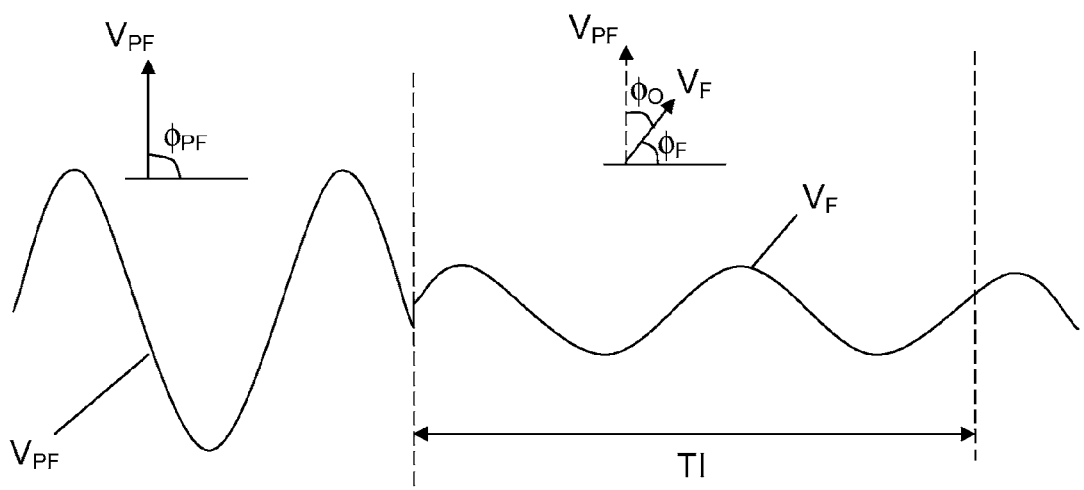
FIG. 4 shows a measured voltage before and after a detected fault as well as the relationship between the phases of the voltage before and after the fault and a phase offset.
Figure 5:
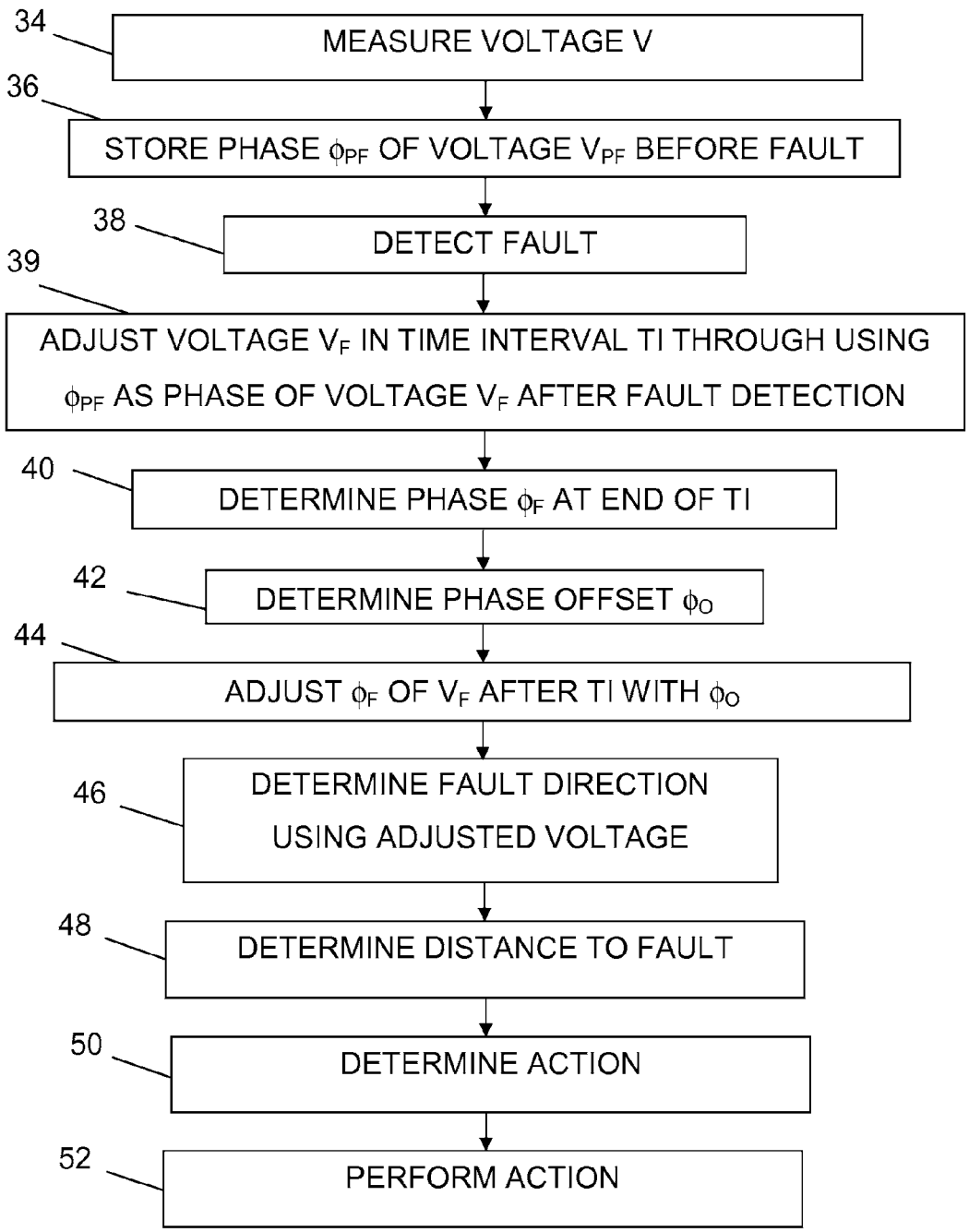
FIG. 5 shows a number of method steps being performed in a method of determining the direction of fault according to the present invention, and FIG. 6 schematically shows a computer program product in the form of a CD ROM disc comprising computer program code for carrying out a method of the present invention.

The functioning of the fault handling device according to the present invention will now be described with reference being made to the previously described FIG. 1-3 together with FIG. 4, which shows a voltage measured at the measurement node before and after a detected fault as well as the relationships between the phases of the voltage before and after the detection of the fault and a phase offset, and FIG. 5, which shows a number of method steps being performed in a method of determining the direction of the fault according to the present invention.

The voltage detecting unit 14 of the fault handling device 12 continuously detects or measures the voltage of the power line 10 at the measurement node, step 34. In the present example it is the positive sequence polarizing voltage that is detected. However the principles of the present invention may be applied on any of the previously described other types of voltages. The voltage $V_{PF}$ being measured before a fault is being detected has a certain shape that varies periodically and then the voltage typically has a sinusoidal shape. It is an AC voltage. The fault direction determining unit 20 here stores or makes the voltage detection unit 14 store the phase $\phi_{PF}$ of the voltage $V_{PF}$ before a fault and optionally also the amplitude of the voltage $V_{PF}$ in the storage device 18, step 36. The voltage $V_{PF}$ here has a phase $\phi_{PF}$ that exists before a fault is detected.

As a fault then occurs, the fault detecting unit 19 thereafter detects the fault, step 38. A fault may be detected in conventional manner and may be detected through changes in the amplitude of the voltage and/or current in the measurement node 11. The fault detecting unit 19 thus detects the fault and signals this fact to the fault direction determining unit 20, to the distance determining unit 22 and to the fault handling decision unit 24. The fault is here detected at a point in time that in FIG. 4 is shown as the beginning of a time interval TI. As can also be seen in FIG. 4 the shape of the measured voltage V here changes, where the change includes a change in amplitude and in phase. As can thus be seen in FIG. 4, the phase of the measured voltage V is changed.

As the fault has been detected and notified by the fault detecting unit 19, the fault direction determining unit 20 continues to receive measurement voltages $V_F$ from the voltage detecting unit 14. It here first adjusts the voltage $V_F$ being measured in a time interval TI that follows directly after the detection of the fault, step 39. This adjustment is done through the fault direction determining unit 20 fetching the phase $\phi_{PF}$ of the measured voltage $V_{PF}$ before the fault from the storage device 18 and using this phase $\phi_{PF}$ as the phase of the voltage $V_F$ during the time interval TI. It thus adjusts the phase of the voltage $V_F$ measured in this time interval TI after the detection of the fault to be the same as that before the fault. At the same time the fault direction determining unit 20 starts to determine the phase $\phi_F$ of the measured voltage $V_F$ after the detection of the fault, step 40. It does this through studying the voltage $V_F$ measured during the same time interval TI. The time interval TI here has a length that is sufficient for enabling the phase of the measured voltage after the fault to be determined. The time interval can here have a length that ranges between 1/10 period of the measured voltage V and 100 periods of the same voltage. The length should at least be 1/10 of the period and is with advantage one period. In the present embodiment the length of the time interval TI equals two periods of the voltage, which enables a safe determination of the phase $\phi_F$ after the detection of the fault. Thereafter the fault direction determining unit 20 applies and determines a phase offset $\phi_O$ based on the phase $\phi_{PF}$ of the measured voltage $V_{PF}$ before the fault and the phase $\phi_F$ of the measured voltage $V_F$ that is determined at the end of the time interval TI, step 42. Here the phase offset $\phi_O$ is determined as the difference between the phase $\phi_{PF}$ of the measured voltage $V_{PF}$ before the fault and the phase $\phi_F$ of the measured voltage $V_F$ determined at the end of the time interval TI.

Thereafter the fault direction determining unit 20 continues to receive measured voltages $V_F$ from the voltage detecting unit 14, which measured voltages are thus measured after the end of the time interval TI, and adjusts the phase of these received voltages with the phase offset $\phi_O$, step 44. This is here done immediately after the time interval TI has elapsed. This means that at least initially the voltage $V_F$ measured after the end of the time interval TI will have the same phase as the voltage $V_{PF}$ had before the fault. The phase offset $\phi_O$ is then continued to be used for adjusting the phase $\phi_F$ of the voltage $V_F$ after the detection of the fault for as long as is necessary, which may be for as long as the fault exists.

The fault direction determining unit 20 then determines the direction of the fault in the measurement node 11 using the adjusted voltage, step 46. It does this in known fashion through obtaining measurements of the current from the current detecting unit 16 and using the voltage as a reference. However in this case the reference is the adjusted measured voltage. Data concerning the fault direction is then provided by the fault direction determining unit 20 to the fault handling decision unit 24.

As the fault has been detected and notified by the fault detecting unit 19, the distance determining unit 22 may also determine the distance to the fault, step 48. This may be determined in a known way based on measured voltages and currents. The fault direction detecting unit 20 and the distance determining unit 22 may finally emit data indicate of the fault direction and the distance to the fault to the fault handling decision unit 24. Based on properties of the fault, which properties may be gathered through measured voltages and currents as well as through changes in the fault direction and distances to the fault, the fault handling decision unit 24 may determine an action to be performed, step 50, and then perform this action, step 52. The action may be to disconnect a section of the electrical power system at the fault, like for instance the power line at the position of the fault. The position of the fault may then be located through knowledge of the distance and the direction that the current is flowing in. The fault handling decision unit 24 may therefore select to disconnect the power line 10 at this position and emit a control signal CTRL which causes this disconnection to be made, which position is as an example at the position of the fourth circuit breaking unit 32 in FIG. 3.

The direction of the fault may be continued to be determined in the above described way for the duration of the fault. If a sudden change of at least one electrical property measured at the measurement node is detected while the fault still exists, such as a sudden change of the phase of the measured voltage, then it is possible to repeat the above mentioned method steps and determine a new offset which new offset is then applied on the measured voltage after the detection of the sudden change in the electrical properties.

As mentioned above the direction of the fault is important information that is used when determining which actions are to be taken in relation to a fault. The direction may then be determined through dividing the current with the voltage. As mentioned earlier one traditional way of determining the direction of fault is to use the reference voltage before the fault. As is also mentioned earlier the fault may furthermore cause slow changes in phase of the measured voltage that are indicative of power swings. If a correct detection of the fault is to be determined, these changes should not be allowed to influence the detected direction of the fault. As the direction of the fault is determined through dividing the current with the voltage, they will however have an influence on this determination when the voltage reference is the voltage before the fault. However, if a voltage measured after the detection of the fault having a phase offset according to the principles of the present invention is used as a reference, these changes in the phase will be cancelled out and thus ignored. Therefore the present invention provides a safer determination of the direction of the fault during the duration of the fault, which furthermore raises the probability of selecting the correct action in relation to the fault.

Figure 6:
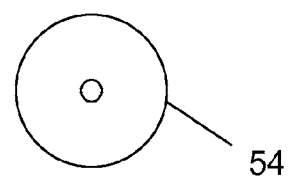

The fault detecting unit, the fault direction determining unit, the distance determining unit and the fault handling decision unit of the fault handling device may be implemented through one or more processors together with computer program code for performing their functions. The program code mentioned above may also be provided as a computer program medium, for instance in the form of one or more data carriers carrying computer program code for performing the functionality of the present invention when being loaded into a fault handling device. One such carrier 54, in the form of a CD ROM disc is generally outlined in FIG. 6. It is however feasible with other data carriers, like diskettes, memory sticks or USB memories. The computer program code can furthermore be provided as pure program code on an external server and fetched from there for provision in the device that is to receive it.

The present invention may be varied in a number of ways. It should for instance be mentioned that it is possible to adjust the whole voltage and not just the phase. In this case also the amplitude of the measured voltage is used before and after the detection of the fault. The amplitude after the detection of the fault would then have to be normalised in relation to the amplitude before the fault. It is here possible that the voltage is provided as a waveform or a vector. In such a case the phase of the measured voltage provided before and after the detection of the fault is thus part of a wave representation of the measured voltage or a vector representation of the measured voltage. It is furthermore possible to omit adjustment of the measured voltage during the above mentioned time interval. In case the system is a small one or if there exist several fault handling devices it may not be necessary to provide a distance determining unit. It may thus be omitted. The fault detecting unit may furthermore be provided as a part of any of the fault direction determining unit, the direction determining unit or the fault handling decision unit. Two or more of these units may furthermore be provided together as one unit. It is furthermore possible that decisions concerning actions in relation to a fault are taken centrally in a control section of the electrical power system and that the fault handling device only reports the data to this control section, which then decides on the action, like a disconnection of a section of a power line. In this case the control section thus includes the fault handling decision unit, which is then not a part of the fault handling device of the present invention. In its simplest form the fault handling device may therefore only include the fault direction determining unit, where this fault handling device is connected to a voltage detecting unit, to a store and to a fault handling decision unit, possibly remotely. Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. The present invention is thus only to be limited by the following claims.

What is claimed is:

1. A method for determining the direction of fault in an electrical power system comprising the steps of:
   measuring a voltage (V) at a measurement node of the electrical power system, and
   storing at least the phase ($\phi_{PF}$) of the measured voltage ($V_{PF}$) before the occurrence of a fault,
   characterised by the further steps of
   determining at least the phase ($\phi_{PF}$) of the measured voltage ($V_{PF}$) at the end of a time interval (TI) following directly after a detection of said fault has been made,
   determining a phase offset ($\phi_O$) as the difference between the phase ($\phi_{PF}$) of the measured voltage ($V_{PF}$) before the fault and the phase ($\phi_F$) of the measured voltage ($V_F$) at the end of the time interval (TI),
   adjusting the phase of the measured voltage ($V_F$) after the detection of the fault with said phase offset ($\phi_O$), and
   using the adjusted measured voltage in determining the direction of fault in relation to said measurement node.

2. The method according to claim 1, further comprising the step of using the phase ($\phi_{PF}$) of the measured voltage ($V_{PF}$) before the fault as the phase ($\phi_F$) of the adjusted measured voltage ($V_F$) after the fault before the offset is determined.

3. The method according to claim 1, wherein the time interval (TI) has a length that is sufficient for enabling the phase ($\phi_F$) of the measured voltage ($V_F$) after the fault to be determined.

4. The method according to claim 3, wherein the time interval (TI) is in the range between 1/10 and 100 periods of the measured voltage at the measurement node.

5. The method according to claim 4, wherein the time interval (TI) is 1/10 of the period of the measured voltage at the measurement node.

6. The method according to claim 4, wherein the time interval (TI) is one period of the measured voltage at the measurement node.

7. The method according to claim 4, wherein the time interval (TI) is two periods of the measured voltage at the measurement node.

8. The method according to claim 1, further comprising the step of detecting said fault in the electrical power system.

9. The method according to claim 1, further comprising the step of determining the distance to the fault from the measurement node.

10. The method according to claim 9, further comprising the step of disconnecting a section of the electrical power system at the fault based on properties of the fault.

11. The method according to claim 1, wherein the steps of storing the phase of a measured voltage, determining the phase of the measured voltage at the end of a time interval, determining a phase offset, adjusting the phase of the measured voltage with said phase offset and using the adjusted measured voltage in determining the direction of fault are repeated in relation to a detected sudden change of at least one electrical property measured at the measurement node.

12. The method according to claim 1, wherein the phase of the measured voltage provided before and after the detection of the fault is part of a wave representation of the measured voltage or a vector representation of the measured voltage.

13. A fault handling device in an electrical power system and comprising:
   a fault direction determining unit arranged to
   receive voltage measurements (V) from a voltage detecting unit arranged to measure a voltage (V) at a measurement node of the electrical power system, and
   store at least the phase ($\phi_{PF}$) of the measured voltage ($V_{PF}$) before the occurrence of a fault in a storage device,
   characterised by the fault direction determining unit being further arranged to determine at least the phase ($\phi_F$) of the measured voltage ($V_F$) at the end of a time interval (TI) following directly after a detection of said fault has been made, determine a phase offset ($\phi_O$) as the difference between the phase ($\phi_{PF}$) of the measured voltage ($V_{PF}$) before the fault and the phase ($\phi_F$) of the measured voltage ($V_F$) at the end of the time interval (TI), adjust the phase ($\phi_F$) of the measured voltage ($V_F$) after the detection of the fault with said phase offset ($\phi_O$), and use the adjusted measured voltage in determining the direction of fault in relation to said measurement node.

14. The fault handling device according to claim 13, wherein the fault direction determining unit is further arranged to use the phase ($\phi_{PF}$) of the measured voltage ($V_{PF}$) before the fault as the phase ($\phi_F$) of the adjusted measured voltage ($V_F$) after the fault before the offset is determined.

15. The fault handling device according to claim 13, wherein the time interval (TI) has a length that is sufficient for enabling the phase ($\phi_F$) of the measured voltage after the fault to be determined.

16. The fault handling device according to claim 15, wherein the time interval (TI) is in the range between 1/10 and 100 periods of the measured voltage at the measurement node.

17. The fault handling device according to claim 16, wherein the time interval (TI) is 1/10 of the period of the measured voltage at the measurement node.

18. The fault handling device according to claim 16, wherein the time interval (TI) is one period of the measured voltage at the measurement node.

19. The fault handling device according to claim 16, wherein the time interval (TI) is two periods of the measured voltage at the measurement node.

20. The fault handling device according to claim 13, further comprising said voltage detecting unit being arranged to measure said voltage (V) at said measurement node of the electrical power system.

21. The fault handling device according to claim 13, further comprising said storage device.

22. The fault handling device according to claim 13, further comprising a fault detecting unit arranged to detect said fault in the electrical power system.

23. The fault handling device according to claim 13, further comprising a distance determining unit arranged to determine the distance to the fault from the measurement node.

24. The fault handling device according to claim 13, further comprising a fault handling decision unit arranged to order disconnection of a section of the electrical power system at the fault based on properties of the fault.

25. The fault handling device according to claim 13, wherein the fault direction determining unit is arranged to repeat storing the phase of a measured voltage, determining the phase of the measured voltage at the end of a time interval, determining a phase offset, adjusting the phase of the measured voltage with said phase offset and using the adjusted measured voltage in determining the direction of fault in relation to a detected sudden change of at least one electrical property measured at the measurement node.

26. The fault handling device according to claim 13, wherein the phase of the measured voltage provided before and after the detection of the fault is part of a wave representation of the measured voltage or a vector representation of the measured voltage.

27. A computer program product for determining the direction of fault in an electrical power system and comprising computer program code provided on a computer readable medium and arranged to make a fault handling device in said electrical power system when said code is loaded into said device:

receive measurements of a voltage (V) at a measurement node of the electrical power system, and store at least the phase ($\phi_{PF}$) of the measured voltage ($V_{PF}$) before the occurrence of a fault, characterised by the computer program code being further arranged to make the fault handling device when said code is loaded into said device determine at least the phase ($\phi_F$) of the measured voltage ($V_F$) at the end of a time interval (TI) following directly after a detection of said fault has been made, determine a phase offset ($\phi_O$) as the difference between the phase ($\phi_{PF}$) of the measured voltage ($V_{PF}$) before the fault and the phase ($\phi_F$) of the measured voltage ($V_F$) at the end of the time interval (TI), adjust the phase ($\phi_F$) of the measured voltage ($V_F$) after the detection of the fault with said phase offset ($\phi_O$), and use the adjusted measured voltage in determining the direction of fault in relation to said measurement node.

* * * * *